J. F. COLE.
COURSE PROTRACTOR.
APPLICATION FILED MAR. 15, 1918.
1,313,520.
Patented Aug. 19, 1919.
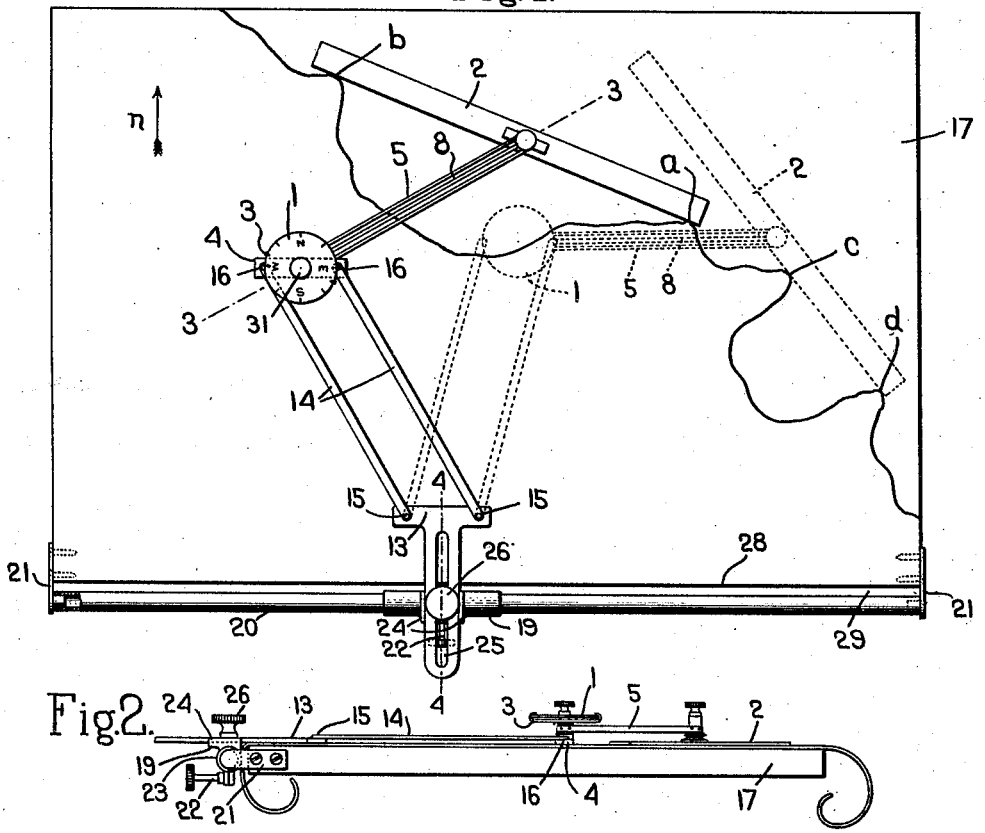
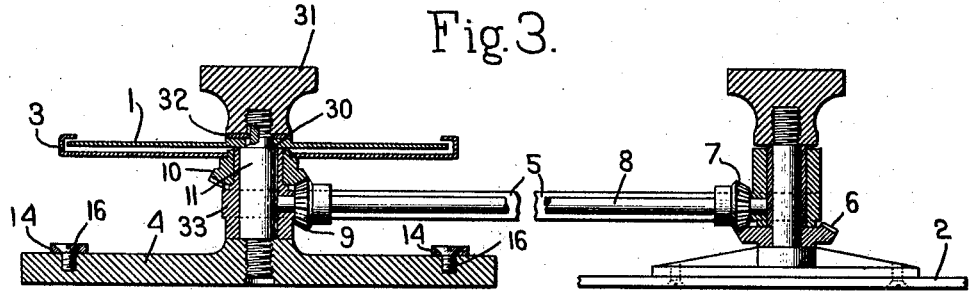
Inventor.
John F. Cole
by Heard Smith & Tennant.
Attys.

UNITED STATES PATENT OFFICE.

JOHN F. COLE, OF SOMERVILLE, MASSACHUSETTS.

COURSE-PROTRACTOR.

1,313,520.  Specification of Letters Patent.  Patented Aug. 19, 1919.

Application filed March 15, 1918. Serial No. 222,539.

*To all whom it may concern:*

Be it known that I, JOHN F. COLE, a citizen of the United States, residing at Somerville, county of Middlesex, State of Massachusetts, have invented an Improvement in Course-Protractors, of which the following description, in connection with the accompanying drawing, is a specification, like characters on the drawing representing like parts.

This invention relates to a device for indicating from a map or chart the direction of one point from another, and is in the nature of an improvement on the device illustrated and described in my Patent No. 868,906, dated October 22, 1907. The device shown in said patent comprises a compass member adapted to be placed upon the chart, a course-indicating member which is pivotally mounted at the end of a radius arm extending from the compass member so that by swinging the radius arm about the compass member as a center and turning the course-indicating member, the latter can be placed so as to connect any two desired points on the chart, and an indicating member or pointer which is associated with the compass member and is connected to the course-indicating member so that the indicating member will always indicate on the compass the direction of the course-indicating member in all positions of the latter.

The object of the present invention is to provide an improvement in the device shown in my above-mentioned patent by which the range of operation thereof can be greatly increased or enlarged.

In order to use the above-mentioned patented device it is first placed on the chart and the compass member is then oriented by adjusting it so that the north and south indication thereon will point due north and south as indicated on the chart, after which the course-indicating member may be swung into different positions to get the direction between any two points on the chart that can be reached by said course-indicating member. If the chart is a large one and it is desired to determine the direction between two points, one or both of which is outside of the range of movement of the radius arm, then it would be necessary to shift the compass member on the chart into a new position, and this would necessitate again orienting the compass member before the device could be used.

In order to increase the range of operation of the device, I have in the present improvement provided a novel mounting for the compass member which permits it to be swung bodily over a considerable area and which at the same time holds the compass member in proper oriented position during its bodily movement from one part of the chart to the other. With my present improvement, therefore, after the compass member has once been properly set or oriented, it can be shifted to various parts of the chart without disturbing the setting, and by means of my improvement, the use of the device on a large chart can be greatly facilitated.

In order to give an understanding of my invention, I have illustrated in the drawings a selected embodiment thereof which will now be described, after which the novel features will be pointed out in the appended claims.

Figure 1 is a plan view of a device embodying my invention;

Fig. 2 is an end view of the device shown in Fig. 1;

Fig. 3 is a section on the line 3—3, Fig. 1;

Fig. 4 is an enlarged section on the line 4—4, Fig. 1.

In the construction illustrated in the drawings, the compass member is shown at 1, the course-indicating member is shown at 2 and the pointer or indicating member is shown at 3. These parts may have substantially the same construction and be associated together in the same way as the corresponding parts of the device illustrated in my said Patent No. 868,906.

The compass member 1 is adjustably carried on a stud 11 which is screwed to the base 4, said stud having the shoulder 30 against which the compass member rests, and said compass member being clamped to the shoulder by a clamp-nut 31 which is screwed to the upper end of the stud. 32 is a washer which is keyed to the stud and is interposed between the nut and the compass member. When the nut 31 is loosened the compass member may be adjusted into different positions and will be held in its adjusted position by the clamping action of the nut 31. Since the washer 32 is keyed to the stud 11, there is no danger that the adjustment of the compass member will be upset when the nut 31 is tightened.

Surrounding the stud 11 is a member 33 from which extends the radius member 5, the member 33 being mounted to turn about the stud so that the radius member may be swung into different angular positions. The course-indicating member 2 is pivoted to the outer end of the radius member 5 and it has rigid therewith a bevel gear 6 which meshes with a bevel gear 7 on a shaft 8 extending longitudinally of the radius member, the inner end of the shaft being journaled in the member 33 and having fast thereon a bevel gear 9 which meshes with a bevel gear 10 that is rotatably mounted on the member 33 which carries the indicator 3. With this construction the swinging of the course-indicating member 2 about its pivot at the end of the radius arm 5 will give a corresponding turning movement to the indicator member 3 so that the indicator member 3 will always indicate on the compass member 1 the direction of the course-indicating member 2.

The above described connection between the indicator member 3 and the course-indicating member 2 is substantially the same as that shown in my above-mentioned patent.

The present invention relates to a novel way of mounting the base 4 so that it can be moved into different positions without disturbing the setting or orientation of said member. The base member 4 is shown as connected to a holder or carriage 13 by means of two parallel arms 14 which are pivoted to the holder 13 at 15 and are also pivotally connected to the base 4 at 16. These arms, together with the holder 13 and base 4, form a parallel-ruler device which permits the compass member to be swung in the arc of a circle, but which holds said compass member always pointed in the same direction. The holder or carriage 13 is herein shown as adjustably mounted on a board or support 17 on which the chart 18 may be placed. Said carriage or holder 13 will preferably be arranged to be adjusted longitudinally of the board so that the carriage can be moved from one end to the other of the board. The holder or carriage 13 is shown as sustained by a slide 19 which is slidably mounted on a rod or guide 20 extending along one edge of the board and herein shown as carried by ears 21 secured to the board. Any suitable means may be employed for clamping the slide 19 to the guide rod 20 in any adjusted position. I have herein shown said slide as provided with the split hub 23 which embraces the rod 20 and have provided the clamping screw 22 for clamping the hub to the rod. The holder or carriage 13 is herein shown as adjustably mounted on the slide. Said slide is provided with the ways or guides 24 in which the holder is received, and the latter is provided with a slot 25 through which extends a clamping screw 26 by which the holder is firmly clamped in adjusted position. This lateral adjustment provides for adjusting the holder or slide 13 toward and from the edge of the board, and the construction of the slide provides for adjusting the holder 13 longitudinally of the board.

The guide rod 20 is spaced from the edge 28 of the board thereby leaving a space 29 so that if the chart which is being used has greater dimensions than the board, said chart may be inserted through the opening, as shown in Fig. 2.

In using the device the chart will be placed on the board and the compass-indicating member 1 will then be oriented so that the north and south marks thereon will point in the north and south direction on the chart. This can be done by loosening the clamping nut 31 and by swinging the course-indicating member 2 to bring it into parallelism with the north and south direction on the chart, which will result in adjusting the indicator member 3 to point in a north and south direction, and then adjusting the compass member 1 until the north and south marks thereon coincide with the direction of the indicator 3. After the compass member has thus been adjusted it will be clamped in adjusted position by tightening the clamping nut 31. The device is then ready for use.

If it is desired to determine the direction between the two points $a$ and $b$ on the chart, then the holder or carriage 13 will be adjusted so that said points $a$ and $b$ will come within the range of movement of the course-indicating member 2. Said member will then be moved so that it will lie on the chart with one edge thereof touching both of the points $a$ and $b$, as seen in full lines, Fig. 1. The reading of the pointer 3 on the compass member 1 will give the direction between the points $a$ and $b$. If, after determining the direction between the points $a$ and $b$ it is desired to determine the direction between two other points $c$ and $d$, which are outside of the range of the radius arm 5 when the compass member is in the full line position, Fig. 1, it will only be necessary to swing the arms 14 about their pivots 15 so as to bring the compass member into a new position in which the two points $c$ and $d$ can be reached by the course-indicating member 2, as shown in dotted lines, Fig. 1, and then to apply said course-indicating member to the two points and read the position of the indicating member 3, as above described.

The swinging of the arms 14 and the consequent bodily movement of the compass member into the dotted line position does not change the setting of the compass member because the "north" of the compass member will always point in the same direction in all positions of the arms 14.

If a still greater range of movement is desired, then the carriage 13 can be adjusted on the slide 19 or the slide and carriage may be adjusted longitudinally of the rod 20 and neither of these adjustments will disturb or affect the setting of the compass member. By means of these various adjustments the direction between any two points on the chart may be determined by simply bringing the course-indicating member into position so that one edge thereof extends from one to the other of said points and then reading the compass member.

I claim:

1. In a course protractor, the combination with a board for supporting a chart, of a slide carried by said board at one edge thereof and adapted to move longitudinally of the board, a carriage or holder secured to said slide for adjustment at right angles to the movement of the slide, a pair of parallel arms pivotally connected at one end to said carriage, a compass member to which the other ends of said arms are pivoted, a radius arm extending from the compass member, a course indicating member pivoted to the radius arm, and means for indicating on the compass member the direction of the course-indicating member.

2. In a course protractor, the combination with a board for supporting a chart, of a carriage adjustably mounted on the board, a pair of parallel arms pivotally connected at one end to said carriage, a base member to which the other end of said arms is pivoted, a stud secured to said base member, a compass member carried by the stud, a sleeve mounted to turn on said stud, a radius arm secured to and extending from said sleeve, a course-indicating member pivoted to the outer end of the radius arm, a shaft extending longitudinally of said radius arm, one end of the shaft having bearing in said sleeve, a pointer associated with said compass member and mounted to turn about said stud, and bevel gears connecting said shaft with said course-indicating member and pointer, respectively.

In testimony whereof I have signed my name to this specification.

JOHN F. COLE.

Copies of this patent may be obtained for five cents each, by addressing the "Commissioner of Patents, Washington, D. C."